(12) United States Patent
Fouet

(10) Patent No.: US 7,264,327 B2
(45) Date of Patent: Sep. 4, 2007

(54) PRESSURE REGULATION BY TRANSFER OF A CALIBRATED GAS VOLUME

(75) Inventor: Jean Michel Fouet, La Ciotat (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 10/484,310

(22) PCT Filed: Jul. 19, 2002

(86) PCT No.: PCT/FR02/02580

§ 371 (c)(1),
(2), (4) Date: Oct. 14, 2004

(87) PCT Pub. No.: WO03/010615

PCT Pub. Date: Feb. 6, 2003

(65) Prior Publication Data

US 2005/0062773 A1  Mar. 24, 2005

(30) Foreign Application Priority Data

Jul. 20, 2001  (FR) .................................. 01 09756

(51) Int. Cl.
*B41J 29/393* (2006.01)
(52) U.S. Cl. .......................... 347/19; 347/84; 347/85; 137/206; 137/209

(58) Field of Classification Search ................. 347/19, 347/84, 85; 137/206, 209
See application file for complete search history.

(56) References Cited

U.S. PATENT DOCUMENTS

| | | | |
|---|---|---|---|
| 4,241,750 A * | 12/1980 | Furuse et al. .......... | 137/101.19 |
| 4,571,599 A | 2/1986 | Rezanka | |
| 5,189,438 A | 2/1993 | Hine et al. | |
| 5,357,996 A * | 10/1994 | Ioannides et al. ............. | 137/12 |
| 5,555,005 A * | 9/1996 | Pagnon .......................... | 347/6 |
| 5,583,544 A * | 12/1996 | Stamer et al. .................. | 347/7 |
| 2001/0017641 A1* | 8/2001 | Kobayashi et al. ........... | 347/85 |
| 2001/0019347 A1* | 9/2001 | Hauck .......................... | 347/86 |

* cited by examiner

*Primary Examiner*—Manish S. Shah
*Assistant Examiner*—Laura E. Martin
(74) *Attorney, Agent, or Firm*—Buchanan Ingersoll & Rooney PC

(57) ABSTRACT

Pressure regulation in a liquid reservoir such as an ink of a jet printing head, is obtained by transferring a calibrated gas volume through an auxiliary reservoir, said regulation is being applied to installations manufacturing intelligent portable objects and more particularly to graphic customization stations.

16 Claims, 2 Drawing Sheets

PRESSURE REGULATION BY TRANSFER OF A CALIBRATED GAS VOLUME

This disclosure is based upon French Application No. 01/09756, filed Jul. 20, 2001, and International Application No. PCT/FR02/02580, filed Jul. 19, 2002, the contents of which are incorporated herein by reference.

BACKGROUND OF THE INVENTION

The invention concerns regulation methods and devices intended in particular for negative-pressure devices applied to the maintenance of a liquid in an open reserve, the opening being situated below the level of the liquid, so as to counteract the flow of the liquid caused by gravity.

The invention applies particularly to heads in printing systems of the "inkjet" type.

These print heads consist of a reservoir of ink provided with an opening situated below the ink filling level and means, in particular piezoelectric, for projecting a fine drop of ink through the opening, in the direction of the medium to be printed. It is by projecting a multitude of these fine drops at appropriate locations that the required printing is carried out.

Outside the projection phases, the ink must be maintained in its reserve despite gravity, which causes a tendency to flow through the opening.

One effective solution consists of maintaining the gas present in the reserve above the ink at a pressure less than atmospheric pressure, with the use of a negative-pressure device.

The correct maintenance of the ink inside an inkjet print head requires very precise regulation of the negative pressure in order to prevent the flow of ink through the opening if the negative pressure is too little, or taking in air through this same opening if the negative pressure is too strong.

Such methods and devices for regulating the negative pressure are known in the prior art.

For example the patent U.S. Pat. No. 5,189,438 describes a device in which a vacuum pump is connected to the ink reserve, above the ink level, and is continuously activated. The calibration of the negative pressure is obtained by virtue of a calibrated leakage orifice, also situated above the ink level.

These devices, based on principles of mechanical calibration of an exhausting of the vacuum, do nevertheless have a certain number of drawbacks.

This is because the value of the negative pressure thus obtained depends on mechanical elements and therefore does not have sufficient precision to guarantee optimum maintenance of the ink.

For these same reasons, the surety in functioning of these regulation devices is not satisfactory since it depends on the cleanliness of the gas conduits and of the exhaust orifice and has too much dependency on the external environment.

In addition, the known devices do not have any adjustment of the set negative pressure value to be maintained in the ink reserve. Changing the set value amounts to physically changing the exhaust orifice by means of an orifice with another calibre, which cannot be carried out dynamically during the functioning of the print head.

SUMMARY OF THE INVENTION

The aim of the invention is to mitigate these drawbacks of the prior art.

To this end, the object of the invention is first of all a method of regulating means of putting under negative or positive pressure a reserve of liquid, for example ink, also containing a gas, for example intended for a print head of the inkjet type, characterised in that it comprises the steps making provision for:

a) defining a set pressure value around which the gas present in the reserve must be maintained;

b) measuring the instantaneous pressure of the gas present in the reserve;

c) comparing the measurement of the instantaneous pressure of the gas present in the reserve with the set pressure value;

d) in cases where the measurement of the instantaneous pressure of the gas present in the reserve is higher than the set pressure value, creating a calibrated volume of gas under negative pressure and then putting it in communication with the reserve;

e) in cases where the measurement of the instantaneous pressure of the gas present in the reserve is less than the set pressure value, creating a calibrated volume of gas under pressure and then putting it in communication with the ink reserve.

Gas under pressure means a gas whose pressure is higher than the set pressure value. Likewise, gas under negative pressure means a gas whose pressure is lower than the set pressure value.

The method described therefore applies either to the regulation of a negative pressure, if the set pressure value is lower than atmospheric pressure, or to the regulation of an overpressure if the set pressure value is higher than atmospheric pressure.

In the case of the application of the method to the obtaining of a partial vacuum, the regulation of the negative pressure is therefore established by injecting a gas at high pressure (higher than the set pressure value) into the liquid reserve when the negative pressure is too strong or by discharging a gas at high pressure (higher than the set pressure value) from the liquid reserve when the negative pressure is too weak.

The resolution of the regulation depends in particular on the calibrated volume of gas injected into or discharged from the liquid reserve. It is therefore easy to obtain a resolution lower than 10 Pa (0.1 millibar) according to the calibration of this volume of gas created, and independently of the control system employed to implement the method according to the invention, whether it is a case for example of a microcomputer, a programmable controller or a device with hard-wired logic gates.

The efficacy of the method is independent of the pressure level to be regulated; it is justified all the more for negative pressures of low value (very close to atmospheric pressure, whilst remaining lower) which are the most difficult to maintain.

In order to create a regulation loop, the steps of measurement (b) and comparison (c) and those of creating a volume and then putting in communication (d or e) can be repeated successively at regular intervals.

It is also possible to define during the method a new set pressure value, the steps of measuring (b) and comparing (c) and those of creating a volume and then putting in communication (d or e) being performed successively, taking account of the new set pressure value in the case of redefinition of this set value.

The method according to the invention therefore constitutes a feedback loop guaranteeing that, with each change in the set pressure value, the internal pressure in the liquid reserve will be regulated accordingly.

According to another embodiment, the method according to the invention comprises, before the measuring step (b), a step making provision for:

a1) defining a minimum threshold pressure value for rapid regulation and a maximum threshold pressure value for rapid regulation, these two values framing the set pressure value;

and, before the comparison step (c), the steps making provision for:

b1) comparing the measurement of the instantaneous pressure of the gas present in the reserve with the minimum and maximum threshold pressure values for rapid regulation;

b2) in cases where the instantaneous pressure of the gas present in the reserve is higher than the maximum threshold pressure for rapid regulation, connecting the reserve to a continuous source of gas under negative pressure until a pressure close to the set pressure value is obtained in the reserve;

b3) in cases where the instantaneous pressure of the gas present in the reserve is lower than the minimum threshold pressure for rapid regulation, connecting the reserve to a continuous source of gas under pressure until a pressure close to the set pressure value is attained in the reserve (1).

According to this embodiment, the regulation takes place in two successive phases:

a first rapid approximate regulation phase making it possible very quickly to attain an internal pressure in the liquid reserve close to the set value by the direct connection of a source of gas under pressure or negative pressure to the liquid reserve;

a second very fine regulation phase enabling the internal pressure of the liquid reserve to approach as close as possible to the set value by the transfer of calibrated gas volumes.

In a particular embodiment, the set pressure value comprises a minimum threshold set pressure value and a maximum threshold set pressure value.

Another object of the invention is a regulation device intended for a device for putting under negative or positive pressure itself intended for a print head in which a liquid reserve also contains a gas, this device being intended for implementing the method described above and comprising:
a related reserve;
means of charging the related reserve with gas under pressure or negative pressure;
means of transferring volumes of gas between the related reserve and the liquid reserve;
means for measuring the instantaneous pressure in the liquid reserve;
control means connected with the measuring means and actuating the charging means and the transfer means;
so that an absolute pressure is maintained around a defined set pressure value.

The use of a related gas reserve makes the device reliable and insensitive to the control system since it does not use the switching or control speeds of any actuators used, such as solenoid valves. This regulation device can also comprise means of selecting the pressure value to be maintained in the liquid reserve, the said means also making it possible to modify the set value during the functioning of the regulation device.

So as to allow regulation in two successive phases, the device can also comprise means of directly connecting the charging means with the liquid reserve.

According to one embodiment, the transfer means comprise a first solenoid valve connecting the related reserve with either the charging means or the liquid reserve.

According to another embodiment, the means of directly connecting the charging means with the liquid reserve comprise a second solenoid valve connecting the charging means with either the related reserve or directly the liquid reserve.

Another object of the invention is a device for putting under negative or positive pressure intended for a print head, for example of the inkjet type, in which a liquid reserve to be printed also contains a gas, this device comprising a supply of gas under pressure, a supply of gas under negative pressure and a regulation device as described above.

According to one embodiment, the charging means comprise a third solenoid valve receiving as an input the supply of gas under pressure and the supply of gas under negative pressure and delivering as an output one or other of these supplies.

Another object of the invention is a machine for printing on a plastic medium comprising a print head provided with a reserve and provided with an opening intended to contain the liquid to be printed as well as a gas, and also comprising a device as described above.

Finally, the object of the invention is an installation for manufacturing intelligent portable objects, such as smart cards, CDs or CD-ROMs, comprising at least one graphical personalisation station consisting of a printing machine as described above.

BRIEF DESCRIPTION OF THE DRAWINGS

Other particularities and advantages of the invention will also emerge from the following description relating to the accompanying drawings, given by way of example.

DETAILED DESCRIPTION

Figure 1:
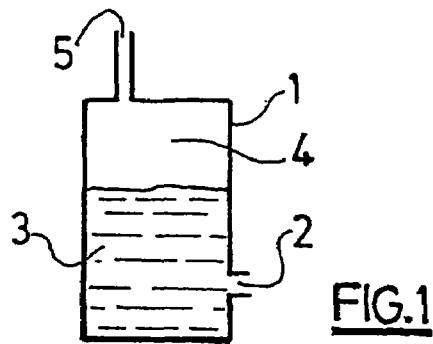
FIG. 1 depicts an ink reserve in a print head of the inkjet type, seen from the side in cross-section.

A liquid reserve 1 (FIG. 1) is used here in the print heads of the inkjet type. Its volume is around $10^5$ mm$^3$ (100 cm$^3$) and contains an ink 3 and a gas 4 and is provided with an opening 2 through which the ink drops which are printed on the medium are ejected.

For other applications, a liquid other than ink can be employed for filling the liquid reserve (1), such as a liquid having adhesive or electrical conduction properties.

The volume of the gas 4 is for example between $10^4$ mm$^3$ (10 cm$^3$) and $9.10^4$ mm$^3$ (90 cm$^3$). Here the gas is air but other gases can be employed for other applications.

So as to avoid, during printing phases, the flow of the ink 3 at rest through the opening 2, the gas 4 is maintained at a pressure lower than atmospheric pressure by virtue of a negative-pressure device connected to an orifice 5 in contact with the gas 4. This is a device for slaving to a required working pressure.

Figure 2:
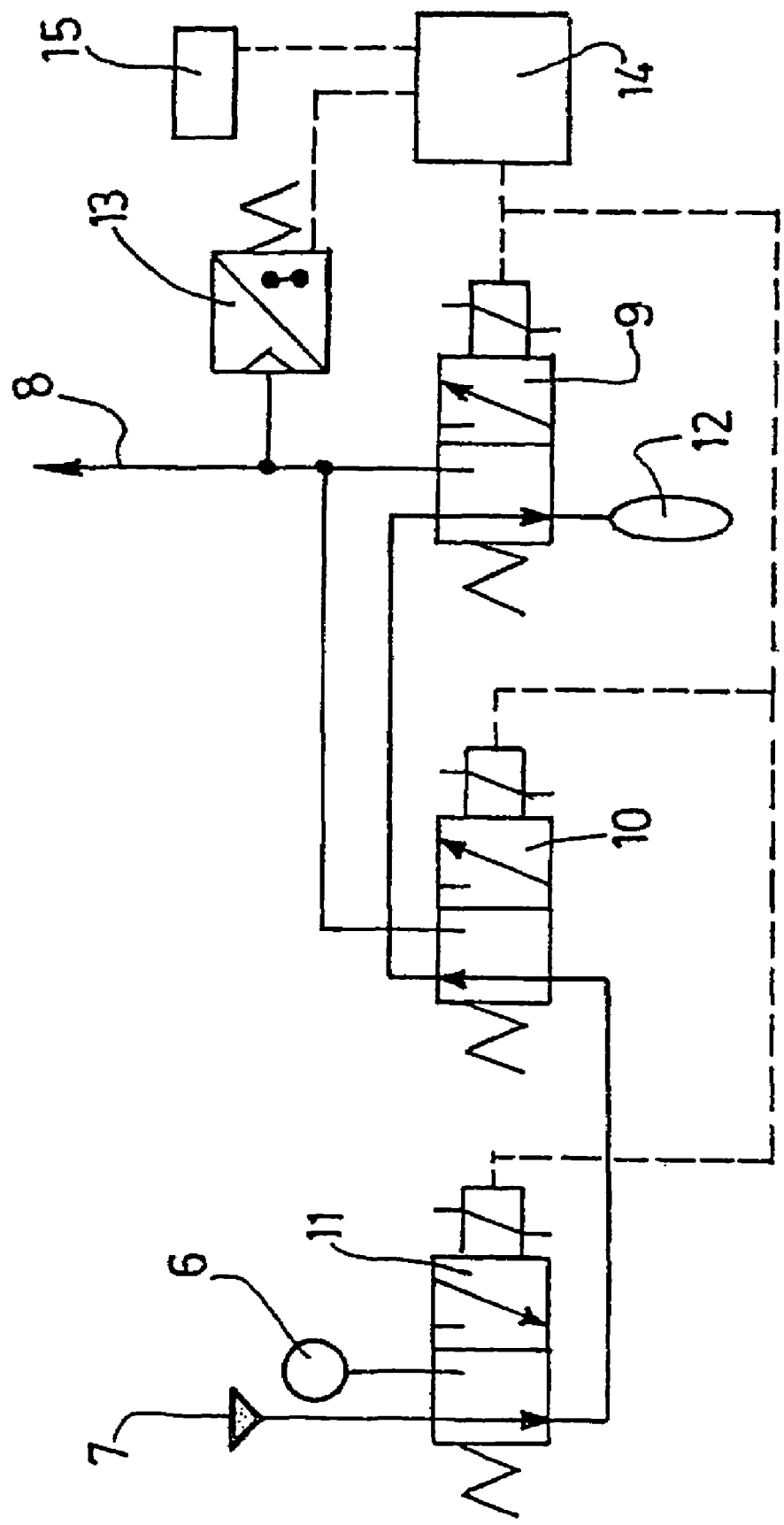
FIG. 2 is a functional diagram of a negative-pressure device according to the invention.

In FIG. 2, such a negative-pressure device constitutes a supply 6 of gas under pressure, a supply 7 of gas under negative pressure and a regulation device forming the interface between these supplies and the reserve 1, the outlet conduit 8 of the regulation device being connected to the orifice 5 of the reserve 1.

The regulation device is formed by three solenoid valves 9, 10, 11, here identical and of the monostable type with three ways and two positions, a related reserve 12, an industrial programmable controller 14, an entry interface 15 and a vacuum switch 13 allowing measurement of the negative pressure.

In the examples, the pressure to be maintained in the reserve 1 has a negative value. However, the invention also applies to positive-pressure regulations, for example for draining the reserve 1 of the liquid which it contains.

The related reserve is in the form of a 5 mm$^3$ sealed enclosure from which a conduit starts.

The programmable controller 14 receives as an input the pressure measurement issuing from the vacuum switch 13 and controls at its output each of the three solenoid valves 9, 10, 11.

The capture interface 15 is also connected to the input of the programmable controller 13 and makes it possible to enter in the internal memory of the latter threshold pressure values necessary for the functioning of the device.

These values can be modified any time during the functioning of the device, the programmable controller 14 taking account of the new values dynamically.

The first solenoid valve 9 connects, in the idle state, the related reserve 12 to an input of the second solenoid valve 10 and, in the actuated state, the related reserve 12 to the conduit 8 connected to the ink reserve 1.

The second solenoid valve 10 connects, in the idle state, an input of the third solenoid valve 11 to the conduit issuing from the first solenoid valve 9 and, in the actuated state, the same input of the third solenoid valve 11 to the conduit 8 connected to the ink reserve 1.

The third solenoid valve 11 connects, in the idle state, the conduit issuing from the second solenoid valve 10 to the supply 7 of gas under negative pressure and, in the actuated state, the conduit issuing from the second solenoid valve 10 to the supply 6 of gas under pressure.

Thus, when the three solenoid valves 9, 10, 11 are in the idle state, the configuration is as follows:
the supply of gas under negative pressure 7 is connected to the related reserve 12 by means of the second 10 and third 11 solenoid valves;
the conduit 8 connected to the ink reserve 1 is itself connected to the vacuum switch.

The programmable controller 14 has in a memory four pressure thresholds which have been communicated to it by means of the capture interface 15:
a minimum rapid regulation threshold
a minimum set value threshold
a maximum set value threshold
a maximum rapid regulation threshold.

The pressure values of the minimum and maximum set value thresholds closely surround the value of the pressure which it is wished to maintain inside the liquid reserve 1 and thus define the low and high limits between which the regulation of the pressure will take place by the transfer of volumes of gas between the related reserve 12 and the liquid reserve 1.

Moreover, the pressure values of the minimum and maximum rapid regulation thresholds frame the set value thresholds and define the low and high limits beyond which the triggering of a direct connection of the ink reserve 1 to one of the gas supplies under pressure 6 or under vacuum 7 will take place.

The programmable controller 14 manages these four thresholds by regularly reading, by means of the vacuum switch 13, the value of the pressure in the ink reserve 1 and actuating the solenoid valves 9, 10, 11 according to the following principle:
the first solenoid valve 9 makes it possible either to charge the related reserve 12 with gas under pressure or under negative pressure, or to put the reserve in communication with the ink reserve 1, the second solenoid valve 10 being maintained in the idle state;
the second solenoid valve 10 makes it possible to connect the gas supplies under pressure 6 or under negative pressure 7 either to the related reserve 12 for its charging, or directly to the ink reserve 1 for rapid regulation;
the third solenoid valve 11 allows selection between the gas supply under pressure 6 and the gas supply under negative pressure 7.

In accordance with the invention, the device whose structure has just been described functions in the manner indicated below.

The user first of all enters the four threshold values in the memory of the programmable controller 14 and puts it in service.

The programmable controller 14 then creates a feedback loop by controlling the pressure of the gas present in the ink reserve 1 and acting on the three solenoid valves 9, 10, 11 in order to maintain this pressure between the two set value thresholds.

A first possible phase of rapid regulation occurs in the case where the value of the pressure in the ink reserve 1 is situated outside the range formed by the two rapid regulation thresholds.

When the value of the pressure in the ink reserve 1 is lower than the minimum rapid regulation threshold pressure value, the ink reserve 1 is connected directly to the supply of gas under pressure 6 so that its internal pressure rapidly attains the maximum rapid regulation threshold.

To do this, the first solenoid valve 9 is left in the idle position, the second solenoid valve 10 is activated and the third solenoid valve 11 is activated.

Likewise, when the value of the pressure in the ink reserve 1 is higher than the maximum rapid regulation threshold pressure value, the ink reserve 1 is connected directly to the supply of gas under negative pressure 7 so that its internal pressure rapidly attains the minimum rapid regulation threshold.

To do this, the first solenoid valve 9 is left in the idle position, the second solenoid valve 10 is activated and the third solenoid valve 11 is left in the idle position.

Following this first phase, the value of the pressure in the ink reserve 1 is situated between the two rapid regulation thresholds, but outside the range formed by the two set value thresholds.

There then occurs a second fine regulation phase by the transfer of calibrated volumes of gas by the related reserve 12.

When the value of the pressure in the ink reserve 1 is lower than the minimum set threshold pressure value, the related reserve 12 is charged with gas under pressure and this volume is immediately transferred into the ink reserve, these operations being repeated as many times as necessary for the value of the pressure in the ink reserve 1 to become higher than the minimum set threshold pressure value.

To do this, the second solenoid valve 10 is left in the idle position, the third solenoid valve 11 is activated, whilst the first solenoid valve 9 starts to clatter, that is to say it is activated and deactivated sequentially, as long as the minimum set value threshold is not attained. This clattering stops as soon as the minimum set value threshold is exceeded and resumes as soon as the pressure in the ink reserve 1 passes below this same threshold.

Likewise, when the value of the pressure in the ink reserve 1 is greater than the maximum set threshold pressure value, the clattering of the first solenoid valve 9 makes it possible to return and maintain the pressure in the ink reserve 1 below the maximum set value threshold, this time leaving the third solenoid valve 11 in the idle position so as to charge the related reserve 12 with gas under negative pressure.

The device is here applied to the regulation of a negative pressure in the reserve 1 so as to keep the liquid 3 inside it.

In another example, a positive pressure is regulated in a similar manner to make it possible to drain the reserve 1 of the liquid which it contains. For example, by selecting a minimum set threshold pressure value of 25,000 Pa (0.25 bar) and a maximum set threshold pressure value of 35,000 Pa (0.35 bar).

Figure 3:
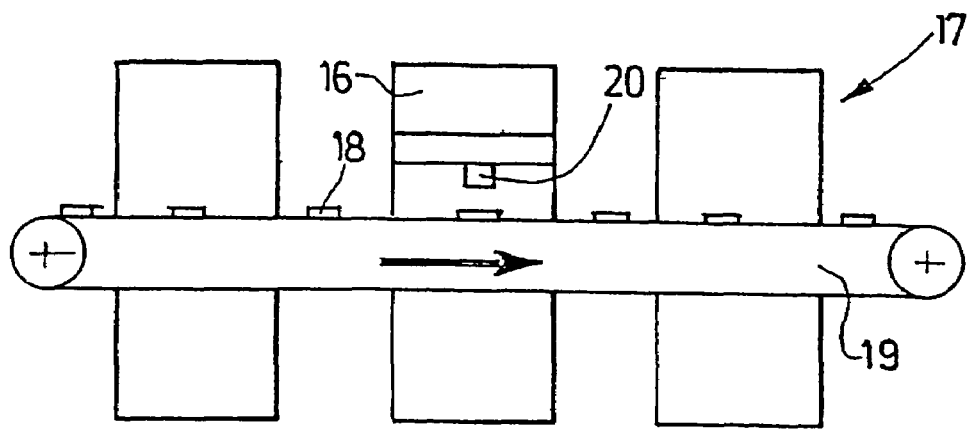
FIG. 3 depicts schematically an installation according to the invention for manufacturing intelligent portable objects.
Figure 4:
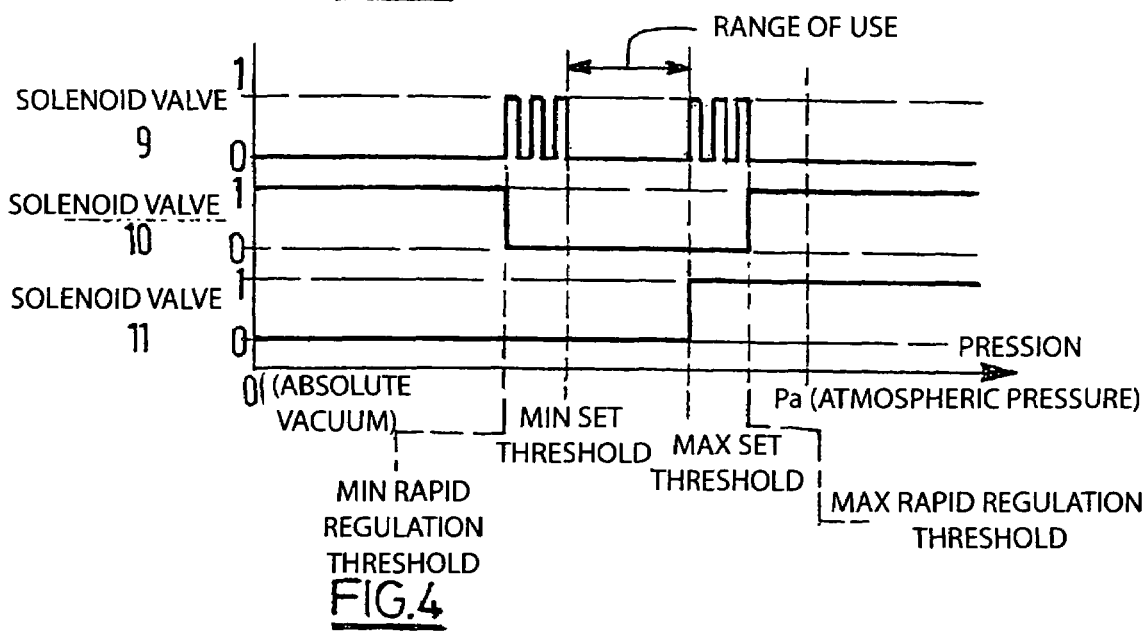
FIG. 4 is a diagram illustrating an example of functioning of the invention.

FIG. 3 shows an application of the negative-pressure device to the manufacture of intelligent portable objects such as smart cards, CDs or CD-ROMs.

The manufacturing installation 17 comprises a conveyer 19 moving the intelligent portable objects 18 from one manufacturing station to another, along the production line.

This installation comprises electronic and graphical personalisation stations, acting after the assembly of the fabricated objects. The station 16 is a printing machine of the inkjet type providing here the graphical personalisation of the objects 18, this machine being provided with at least one print head 20 in which the ink is kept by a negative pressure regulated by virtue of a device and method according to the invention.

The invention claimed is:

1. A method of regulating negative or positive pressure in a reserve of liquid also containing a gas, comprising the following steps:
   a) defining a set pressure value around which the gas present in the reserve is to be maintained, and defining minimum and maximum threshold pressures for fast regulation that are respectively less than and greater than said set pressure value;
   b) measuring the instantaneous pressure of the gas present in the reserve;
   c) when the measured instantaneous pressure is less than said minimum threshold pressure or greater than said maximum threshold pressure, connecting said reserve with a continuous source of gas under positive or negative pressure, respectively, until said instantaneous pressure reaches a value between said threshold pressures;
   d) comparing the measurement of the instantaneous pressure of the gas present in the reserve with the set pressure value;
   e) in cases where the measurement of the instantaneous pressure of the gas present in the reserve is higher than the set pressure value, creating a calibrated volume of gas under negative pressure and then pulling it in communication with the reserve; and
   f) in cases where the measurement of the instantaneous pressure of the gas present in the reserve is less than the set pressure value, creating a calibrated volume of gas under pressure and then putting it in communication with the reserve.

2. A method according to claim 1, wherein the steps of measuring (b) and comparing (d) and those of creating a calibrated volume and then putting it in communication (e or f) are repeated successively at regular intervals.

3. A method according to claim 2, further including the step of defining a new set pressure value, and wherein the steps of measuring (b) and comparing (d) and those of creating a volume and then putting it in communication (e or f) are performed successively, taking into account the new set pressure value.

4. A method according to claim 1, wherein the set pressure value comprises a minimum set threshold pressure value and a maximum set threshold pressure value.

5. A regulation device for putting under negative or positive pressure a reserve of liquid that also contains a gas, comprising:
   a related reserve;
   means for charging the related reserve with gas under pressure or negative pressure;
   means for transferring volumes of gas between the related reserve and the reserve of liquid;
   means for connecting the reserve of liquid directly to said charging means;
   means for measuring the instantaneous pressure in the reserve of liquid; and
   control means connected with the measuring means and actuating the connecting means when the measured instantaneous pressure is less than a minimum threshold pressure for rapid regulation or greater than a maximum threshold pressure for rapid regulation, and for actuating the charging means and the transfer means when the measured instantaneous pressure is at a value between said two threshold pressures, so that an absolute pressure is maintained around a defined set pressure value.

6. A regulation device according to claim 5, further comprising means for selecting the set pressure value to be maintained in the reserve of liquid, said means also making it possible to modify the set value during the functioning of the regulation device.

7. A regulation device according to claim 5, wherein the transfer means comprise a solenoid valve that selectively connects the related reserve with either the charging means or the reserve of liquid.

8. A regulation device according to claim 5, wherein the means for directly connecting the charging means with the reserve of liquid comprise a solenoid valve that selectively connects the charging means with either the related reserve or directly the liquid reserve.

9. A regulation device according to claim 5, wherein the set pressure value has a value lower than atmospheric pressure so that a negative pressure is maintained in the reserve.

10. A regulation device according to claim 5, wherein the set pressure value has a value higher than atmospheric pressure so that an overpressure is maintained in the reserve.

11. A device for puffing a print head under negative or positive pressure, in which a reserve of liquid to be printed also contains a gas, comprising:
   a supply of gas under pressure;
   a supply of gas under negative pressure; and a regulation device according to claim 5.

12. A pressure regulating device according to claim 11, wherein the charging means comprise a solenoid valve receiving as an input the gas supply under pressure and gas supply under negative pressure, and delivering as an output one or the other of these supplies.

13. A machine for printing on a plastic medium, comprising a print head with a reserve and provided with an opening to contain a liquid to be printed as well as a gas, and a regulation device according to claim 5.

14. An installation for manufacturing intelligent portable objects, comprising at least one graphical personalisation station having a machine according to claim 13.

15. A method of regulating pressure in a reserve of liquid also containing a gas, comprising the following steps:

defining a set pressure value around which the gas present in the reserve is to be maintained, and defining minimum and maximum threshold pressures that are respectively less than and greater than said set pressure value;

measuring the instantaneous pressure of the gas present in the reserve;

when the measured instantaneous pressure is less than said minimum threshold pressure, connecting said reserve with a continuous source of gas under positive pressure, until said instantaneous pressure reaches a value between said threshold pressures;

when the measured instantaneous pressure is greater than said maximum threshold pressure, connecting said reserve with a continuous source of gas under negative pressure, until said instantaneous pressure reaches a value between said threshold pressures;

when the instantaneous pressure is between said threshold pressures, comparing the instantaneous pressure of the gas present in the reserve with the set pressure value, and:

if the instantaneous pressure of the gas present in the reserve is higher than the set pressure value, creating a calibrated volume of gas under negative pressure and then putting said calibrated volume in communication with the reserve; and if the instantaneous pressure of the gas present in the reserve is less than the set pressure value, creating a calibrated volume of gas under pressure and then putting said calibrated volume in communication with the reserve.

16. A device for regulating the pressure of a reservoir of liquid that also contains a gas, comprising:

a reserve that defines a calibrated volume of gas;

a source of gas under at least one of positive pressure and negative pressure;

a transfer system for transferring volumes of gas between the reserve and the reservoir of liquid;

a changing system for connecting the reservoir of liquid directly to said source of gas;

a sensor for measuring the instantaneous pressure in the reservoir of liquid; and a controller connected with the sensor and actuating the charging system when the measured instantaneous pressure is less than a minimum threshold pressure or greater than a maximum threshold pressure, and for actuating the transfer system when the measured instantaneous pressure is at a value between said two threshold pressures, so that the pressure in said reservoir is maintained around a defined set pressure value.

* * * * *